Sept. 14, 1954  E. A. REUSSENZEHN  2,689,120
SCALE
Filed June 28, 1950
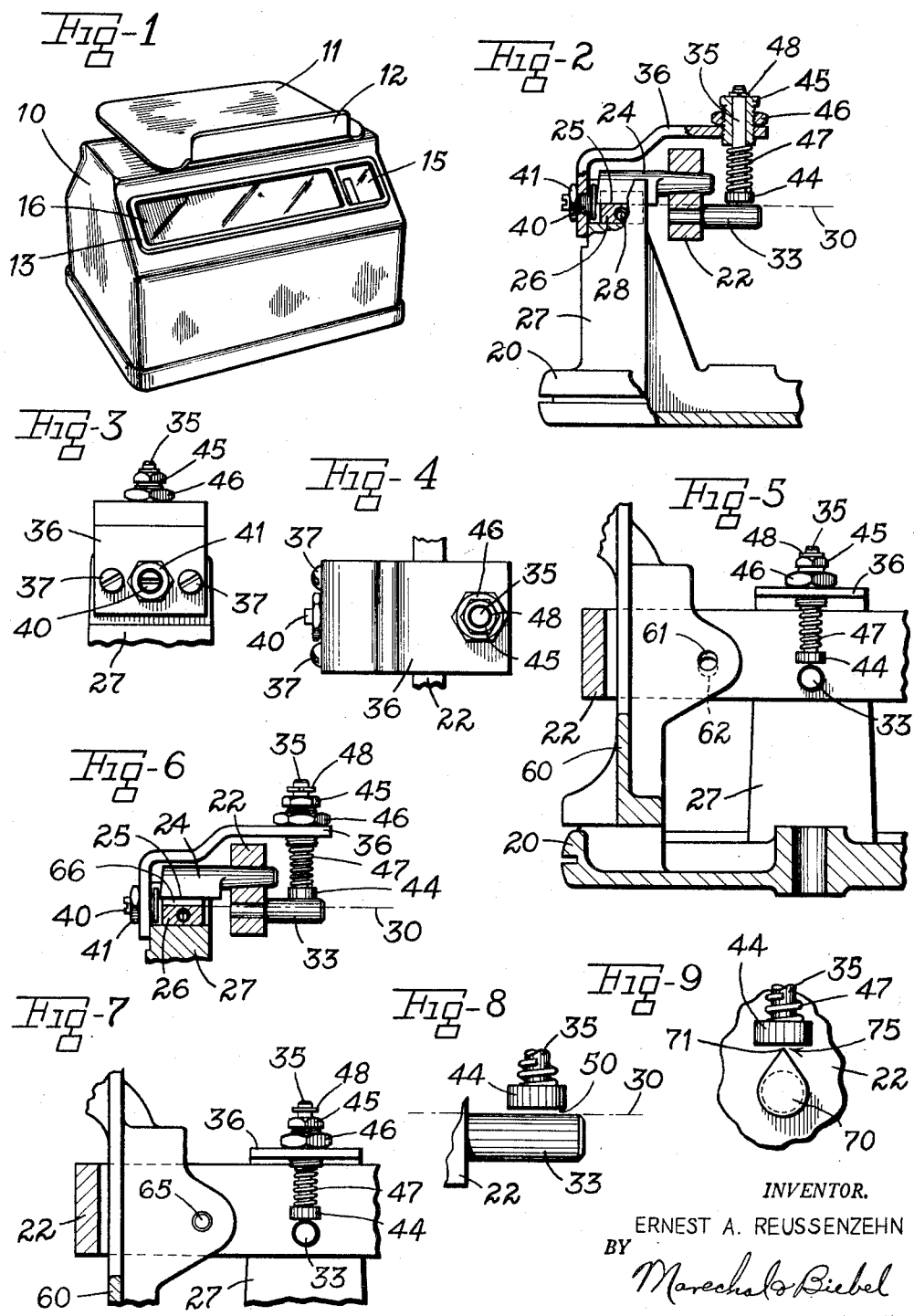
INVENTOR.
ERNEST A. REUSSENZEHN
BY Marechal & Biebel
ATTORNEYS Patented Sept. 14, 1954

2,689,120

UNITED STATES PATENT OFFICE 2,689,120

SCALE

Ernest A. Reussenzehn, Dayton, Ohio, assignor to The Hobart Manufacturing Company, Troy, Ohio, a corporation of Ohio Application June 28, 1950, Serial No. 170,795

1 Claim. (Cl. 265—27)

This invention relates to scales.

The invention has particular relation to scales of the type wherein the weighing platform is carried by a lever supported on one or more pivot elements having a knife edge which is subject to displacement with respect to its supporting bearing as a result of off-center loading of the platform, in which event the accuracy of the scale may be affected, and which also is subject to damage by such relative displacement in the event of shock to the scale such as may be caused during shipping or the like. The present invention is directed particularly to the provision of a hold-down mechanism for a scale of this type which will effectively limit such relative displacement of the pivot element and its bearing and which at the same time will cooperate with the pivot element during shipment or other non-use of the scale to prevent damage to the pivot element or the bearing therefor resulting from relative displacement thereof.

In accordance with the invention, the hold-down mechanism includes a hold-down member carried by the base of the scale and a cooperating abutment on the lever which has an upper edge portion substantially coaxial with the fulcrum axis of the pivot element. The hold-down member is supported in such manner as to overhang this edge portion of its cooperating abutment but is set in predetermined spaced relation therewith such that under normal operating conditions, there is a predetermined slight clearance therebetween but with the hold-down member thus acting to limit relative displacement of the pivot element and bearing but normally having no contact with the lever mechanism.

In operation with this hold-down mechanism, under normal loading conditions the pivot element remains fulcrumed in its bearing, and since the desired clearance is thus maintained between the hold-down member and its cooperating abutment on the lever, the lever is completely free of any loading or friction effect of the hold-down mechanism. However, in the event of off-center loading of the weighing platform sufficient to cause the pivot element to lift from its bearing, the abutment will come in contact with the hold-down member as soon as it crosses the clearance space therebetween, and thus the relative displacement of the pivot element and bearing is effectively limited.

Also, in order to guard against damage from relative movement of the pivot element and bearing during shipment or the like, and at the same time to make possible accurate presetting of the hold-down member at the factory to the proper predetermined clearance position with respect to the pivoting axis of the lever, the hold-down member is so mounted with respect to the base of the scale as to be movable upwardly from its operating position and is provided with a relatively strong spring biasing it against such upward movement. Accordingly, when it is desired to ship the scale, or for other conditions of non-use, the lever can be raised manually against the strong spring of the hold-down mechanism to a clearance position of the pivot with respect to its bearing and then wedged or otherwise secured in this raised and inoperative position. Under such conditions, the spring aids in holding the lever firmly against movement during shipment, and then when it is desired to return the scale to active use, by release of the lever for return to its operating position, the spring immediately returns the hold-down member to its proper and preset clearance position with respect to its cooperating abutment for use of the scale as described.

It is accordingly one of the principal objects of the present invention to provide a hold-down mechanism for scales of the above type which will effectively limit relative displacement of the pivot element for the scale lever and its supporting bearing during use without contact with the lever mechanism under normal operating conditions, and which in addition will cooperate with the lever mechanism during shipment or other non-use of the scale to prevent relative movement of the pivot element and bearing capable of causing damage thereto.

It is also an object of the invention to provide such a hold-down mechanism which is simple and economical in construction, which may be accurately preset at the factory to its preferred clearance position for operation, and which will retain its preset position during shipment without requiring subsequent adjustment for use.

Other objects and advantages of the invention will be apparent from the following description, the accompanying drawing and the appended claim.

In the drawing—

Fig. 1 is a perspective view of a scale constructed in accordance with the invention as viewed from the customer's side;

Fig. 2 is an enlarged fragmentary view, partially broken away and in section, showing a hold-down mechanism in accordance with the invention and in operating position;

Fig. 3 is a fragmentary elevational view at right angles to Fig. 2;

Fig. 4 is a top plan view of the hold-down mechanism;

Fig. 5 is a front fragmentary view at right angles to Fig. 2 with the mechanism in operating position;

Fig. 6 is a fragmentary section similar to Fig. 2 and showing the mechanism in inoperative position for shipment of the scale;

Fig. 7 is a fragmentary view similar to Fig. 5 showing the mechanism in inoperative position;

Fig. 8 is a further enlarged view of a fragment of Fig. 2; and

Fig. 9 is an enlarged fragmentary view showing another form of the invention in operating position.

Referring to the drawing, which illustrates preferred embodiments of the invention, the scale shown in Fig. 1 includes a generally rectangular casing 10 having the loading platform 11 at the top and provided with the usual flange 12 at the customer's side. The frame 13 set in the casing 10 at the customer's side of the scale includes the usual viewing window 15 through which the customer may observe the weight readings on the scale, and an additional larger window 16 is usually provided within which may be advertising material or the like. A detailed disclosure of a scale of this type may be found in Meeker et al. Patent 2,287,814 issued June 20, 1942, to the same assignee as this application.

The casing 10 is supported on the base 20 of the scale, and the weighing platform is carried by the lever shown fragmentarily at 22. The lever is provided with a pivot element 24 at either side of the lever, shown as having a knife edge fulcruming portion 25, and each of these pivot elements is fulcrumed in a bearing 26 carried by an upwardly projecting portion 27 of the base and held therein by means such as a cotter pin 28. Under normal operating conditions, the bearing 26 and the knife edge 25 of the pivot element define the pivoting axis or range line of the lever represented by the broken line 30 in Figs. 2, 6 and 8.

The hold-down mechanism for the pivot element includes a hold-down pin 33 carried by the lever on its opposite side from the pivot element 24 in predetermined relation with the pivot element such that the uppermost portion of the surface of the pin 33 is directly coaxial with knife edge 25. This pin 33 acts as the cooperating abutment on the lever for the hold-down stud 35, which is carried by a bracket arm 36 secured to the base projection 27 by a pair of screws 37 and extending inwardly of the base above the pivot element 24 and lever 22. The bracket 36 also carries an adjustable thrust screw 40 having an enlarged head in position to engage the end of pivot element 24, the thrust screw 40 being threaded through bracket 36 as shown in Fig. 2 and provided with a lock nut 41.

The hold-down stud 35 includes an enlarged head portion 44 and a cylindrical shank slidable in a threaded bushing 45. This bushing 45 forms an adjustment stud for the hold-down stud 35, and it is threaded through the bracket 36 and is provided with a lock nut 46. A relatively strong and stiff spiral spring 47 is mounted on the cylindrical portion of the hold-down stud 35 between its head 44 and the bushing 45, and a retaining ring 48 is secured within a circumferential groove at the upper end of the hold-down stud to limit its downward movement with respect to the bushing.

In operation with this hold-down mechanism, the adjustable bushing 45 is preset in bracket 36 to such position that when the pivot element 24 is in properly seated relation with its bearing 26, there will be a predetermined small clearance between the head 44 of the hold-down stud 35 and the adjacent edge portion of the hold-down pin 33. This clearance is shown at 50 in the somewhat exaggerated view in Fig. 8, and it will be seen that in fact the clearance is between the operating end of the hold-down stud and the range line 30 of the lever. The extent of the clearance is preferably such that under normal loading of the weighing platform 11, there will be no contact between the hold-down stud 35 and the pin 33, but in the event of an off-center loading condition such that the pivot element tends to lift from its bearing 26, the pin 33 will then promptly come in contact with the stud 35 to limit this lifting movement of the pivot element. Satisfactory results have been obtained in a scale of the type shown when the relative adjustment of the hold-down stud and the pin 33 is such that the clearance therebetween in the normal operating position of the scale is of the order of 0.010 inch.

In order to facilitate desired effective separation of the pivot element 24 and bearing 26 during shipment of the scale, and thus to prevent possible damage from contact therebetween, the lever 22 and an upward projection 60 on the base are provided with matching holes 61 and 62 for receiving a locking pin 65. These holes 61 and 62 are in such vertical relation that in the normal operating position of the lever shown in Fig. 5, the hole 62 in the lever will be somewhat below the hole 61 in the base portion 60, for example approximately $\frac{1}{16}$ inch. Thus when the lever is raised sufficiently to bring the two holes into accurate coincidence for receiving a locking pin 65, the pivot element 24 will have its knife edge 25 correspondingly raised above and out of contact with its bearing 26. Also, since this extent of upward movement of the lever is substantially in excess of the normal clearance 50 between the hold-down stud 35 and pin 33, it will result in raising the stud against its spring 47 as shown in Figs. 6 and 7.

It will thus be seen that in this relative position of the parts, the pivot element and bearing will be separated by a sufficient clearance space 66 to prevent contact therebetween resulting from shock during shipment or the like, but as soon as the locking pin 65 is removed, the lever will return to its normal position, and also the spring 47 will immediately return the hold-down stud 35 to its present clearance position as described. This in turn makes it possible for the hold-down mechanism to be preset and locked at the factory in accurately adjusted operating position, and this adjustment will not be affected by shipment of the scale, so that when the user receives the scale and is ready to set it in operation, he need only remove the locking pin 65 and is not required to make further adjustments of the hold-down mechanism.

Fig. 9 shows an enlarged fragmentary view similar to Fig. 8 and showing a somewhat different construction of hold-down pin 70 corresponding in function to the hold-down pin 33, the view in Fig. 9 being in elevation looking towards the unsupported end of the pin 70. As shown, this pin includes a knife edge 71 along its uppermost side, and the pin 70 is of such portions and is so positioned in the lever 22 that its knife edge 71 is coaxial with the knife edge on the associated pivot element as already described. Fig. 9 shows the normal operating position with the hold-down stud adjusted to provide clearance at 75 between its lower end and the knife edge 71. Otherwise the construction and operation of this form of the invention is the same as described in connection with Figs. 2 to 8.

While the forms of apparatus herein described constitute preferred embodiments of the invention, it is to be understood that the invention is not limited to these precise forms of apparatus, and that changes may be made therein without departing from the scope of the invention which is defined in the appended claim.

What is claimed is:

A pivot holddown for a scale having a base, a load platform, and a lever having a knife edge pivot adapted to be supported in a bearing on said base for pivotal support of said lever in the weighing action of said scale, comprising an abutment carried by said lever adjacent said knife edge, said abutment having a cylindrically curved upper surface of substantial length extending in the same direction as said knife edge, said abutment and said knife edge being movable upwardly relative to said base and said bearing in response to uneven application of load to said platform, a holddown member having a lower face of substantial area opposed to said curved surface of said abutment and adapted to engage said curved surface over a line of contact in response to said raising of said knife edge above said bearing, means for mounting said holddown member in a normal position directly above said curved surface of said abutment, said holddown member and said mounting means cooperating to maintain said holddown member in such relation to said abutment that said lower face thereof remains in slightly spaced relation from said curved surface as long as said knife edge occupies its operative position within said bearing but in travel-limiting relation thereto when said knife edge raises away from its said bearing, means in said mounting means providing for deflection of said holddown member away from its normal position and resulting increased separation of said knife edge from its bearing, and means for retaining said knife edge in said position of increased separation and away from its bearing during shipment and the like.

References Cited in the file of this patent

UNITED STATES PATENTS

| Number | Name | Date |
|---|---|---|
| 895,125 | Theobald | Aug. 4, 1908 |
| 1,166,128 | Hapgood | Dec. 28, 1915 |
| 1,367,220 | Wetzel | Feb. 1, 1921 |
| 1,600,155 | Wetzel | Sept. 14, 1926 |
| 1,785,382 | Hurt | Dec. 16, 1930 |
| 1,954,205 | Hem | Apr. 10, 1934 |
| 2,066,624 | Hem | Jan. 5, 1937 |
| 2,272,150 | Hem | Feb. 3, 1942 |
| 2,334,326 | Hem | Nov. 16, 1943 |
| 2,341,226 | Marshall | Feb. 8, 1944 |